United States Patent
Chen et al.

(10) Patent No.: US 10,936,592 B2
(45) Date of Patent: Mar. 2, 2021

(54) DYNAMIC FUNCTION INVOCATION

(71) Applicant: ENTIT Software LLC, Sunnyvale, CA (US)

(72) Inventors: Qiming Chen, Sunnyvale, CA (US); Rui Liu, Sunnyvale, CA (US); Meichun Hsu, Sunnyvale, CA (US)

(73) Assignee: Micro Focus LLC, Santa Clara, CA (US)

( * ) Notice: Subject to any disclaimer, the term of this patent is extended or adjusted under 35 U.S.C. 154(b) by 255 days.

(21) Appl. No.: 15/565,521

(22) PCT Filed: Apr. 30, 2015

(86) PCT No.: PCT/US2015/028636
§ 371 (c)(1),
(2) Date: Oct. 10, 2017

(87) PCT Pub. No.: WO2016/175858
PCT Pub. Date: Nov. 3, 2016

(65) Prior Publication Data
US 2018/0089273 A1    Mar. 29, 2018

(51) Int. Cl.
*G06F 16/00* (2019.01)
*G06F 16/2455* (2019.01)
*G06F 16/21* (2019.01)
*G06F 16/242* (2019.01)

(52) U.S. Cl.
CPC .......... *G06F 16/2455* (2019.01); *G06F 16/21* (2019.01); *G06F 16/2433* (2019.01)

(58) Field of Classification Search
CPC ... G06F 16/2455; G06F 16/21; G06F 16/2433
USPC ........................................................ 707/718
See application file for complete search history.

(56) References Cited

U.S. PATENT DOCUMENTS

| | | | | |
|---|---|---|---|---|
| 6,058,393 A | * | 5/2000 | Meier | G06F 11/3664 707/999.01 |
| 6,324,683 B1 | * | 11/2001 | Fuh | G06F 11/362 714/E11.21 |
| 6,578,037 B1 | * | 6/2003 | Wong | G06F 21/6227 707/694 |
| 6,621,589 B1 | * | 9/2003 | Al-Kazily | G06F 3/1205 358/1.15 |
| 7,792,824 B2 | | 9/2010 | Anderson | |

(Continued)

FOREIGN PATENT DOCUMENTS

WO    2005081668 A2    9/2005

OTHER PUBLICATIONS https://web.archive.org/web/20150417230128/http://dev.mysql.com/doc/refman/5.7/en/create-function-udf.html; See lines 11-13 and 19-21.Date: Apr. 17, 2015.

(Continued)

*Primary Examiner* — Thanh-Ha Dang

(57) ABSTRACT

According to an example, dynamic function invocation may include ascertaining a query for a database management system (DBMS). Dynamic function invocation may further include implementing a dynamic function as a meta user defined function to invoke a plurality of different coded functions including a coded function that is to be invoked by the query to perform an operation related to the DBMS, and executing the dynamic function by the query to load and invoke the coded function to perform the operation related to the DBMS.

15 Claims, 5 Drawing Sheets

(56) References Cited

U.S. PATENT DOCUMENTS

| | | | |
|---|---|---|---|
| 8,195,697 B2 * | 6/2012 | Maeda | G06F 30/30 707/793 |
| 8,448,159 B2 | 5/2013 | Cochinwala et al. | |
| 8,538,985 B2 | 9/2013 | Betawadkar-Norwood | |
| 8,914,807 B2 | 12/2014 | Crisan et al. | |
| 2003/0191769 A1 * | 10/2003 | Crisan | G06F 16/24553 |
| 2007/0038662 A1 * | 2/2007 | Bendel | G06F 16/21 |
| 2008/0295092 A1 * | 11/2008 | Tan | G06Q 30/04 717/178 |
| 2009/0031291 A1 * | 1/2009 | Adams | G06F 8/51 717/137 |
| 2009/0187590 A1 * | 7/2009 | Maeda | G06F 30/30 |
| 2011/0029551 A1 * | 2/2011 | Chen | G01D 11/28 707/759 |
| 2012/0078951 A1 * | 3/2012 | Hsu | G06F 16/24532 707/769 |
| 2012/0191690 A1 * | 7/2012 | George | G06F 16/24547 707/708 |
| 2012/0191732 A1 * | 7/2012 | George | G06F 16/283 707/755 |
| 2013/0138626 A1 * | 5/2013 | Delafranier | G06F 16/2453 707/713 |
| 2014/0046928 A1 * | 2/2014 | Konik | G06F 16/24542 707/718 |
| 2015/0120699 A1 * | 4/2015 | Faerber | G06F 16/221 707/718 |
| 2015/0310045 A1 * | 10/2015 | Konik | G06F 16/2455 707/741 |

OTHER PUBLICATIONS

IBM, "Developing User-defined Routines (SQL and External)," (Research Paper), Mar. 2008, 393 pages.

Wang, L. et al., "Database Connectivity in OPL," (Research Paper), IBM Software Group, Nov. 5, 2013, 42 pages.

International Searching Authority., International Search Report and Written Opinion dated Feb. 25, 2016 for PCT Application No. PCT/US2015/028636 Filed Apr. 30, 2015, 12 pgs.

* cited by examiner

200

```
ASCERTAIN A QUERY FOR A DATABASE MANAGEMENT
SYSTEM (DBMS)
202
```

↓

```
IMPLEMENT A DYNAMIC FUNCTION AS A META USER DEFINED
FUNCTION TO INVOKE A PLURALITY OF DIFFERENT CODED
FUNCTIONS INCLUDING A CODED FUNCTION THAT IS TO BE INVOKED
BY THE QUERY TO PERFORM AN OPERATION RELATED TO THE DBMS
204
```

↓

```
EXECUTE THE DYNAMIC FUNCTION BY THE QUERY TO LOAD AND
INVOKE THE CODED FUNCTION TO PERFORM THE OPERATION
RELATED TO THE DBMS
206
```

FIG. 2

DYNAMIC FUNCTION INVOCATION

BACKGROUND

A database management system (DBMS) typically includes a set of machine readable instructions to catalog, retrieve, and execute queries on data. A query may receive the data, invoke a function that performs an operation on the data, and generate an output based on the invocation of the function.

BRIEF DESCRIPTION OF DRAWINGS

Features of the present disclosure are illustrated by way of example and not limited in the following figure(s), in which like numerals indicate like elements, in which:

FIG. 2 illustrates a method for dynamic function invocation, according to an example of the present disclosure;

DETAILED DESCRIPTION

Figure 1:
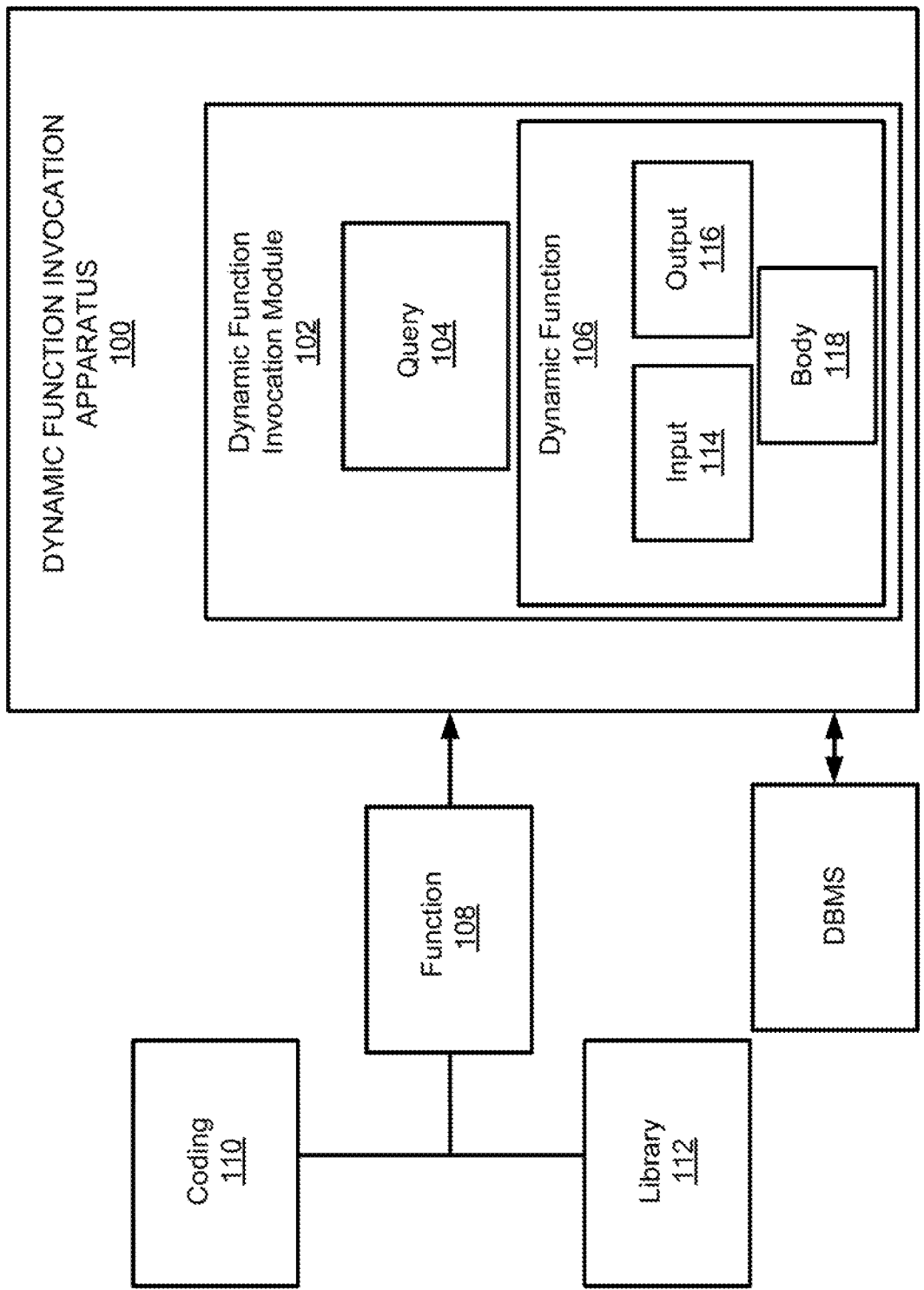
FIG. 1 illustrates an architecture of a dynamic function invocation apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

With respect to a DBMS that may include a set of machine readable instructions to catalog, retrieve, and execute queries on data, where a query may invoke a function that performs an operation on the data, such a function may be defined by a user and designated as a user defined function. A user defined function may generally map a list of arguments to a single resulting value. Since the user defined function is executed in a query, and its input and output are from and to tables or intermediate query results, query engine specific application programming interfaces (APIs) may need to be used for reading input and writing output. Since the user defined function may need to be executed in a query evaluation pipeline on a tuple by tuple basis, the user defined function may need to be coded in a specific pattern of dataflow and control flow. In order to be invoked in a query, a user defined function may need to be registered with a query engine. When multiple user defined functions are used, each of the user defined functions may need to be registered with the query engine. The registration of each user defined function may be system specific, and may thus result in additional effort, inconsistent results, and/or unsatisfactory performance.

For example, with respect to development and registration of a user defined function, and example of a function may include a function to add two integers as follows:

Pseudo-code (1)

```
int add2Ints(int a, int b) {
    return a + b;
}
```

For Pseudo-code (1), a and b may represent integers that are to be added, and Pseudo-code (1) may represent a scalar function.

With respect to a specific example of a DBMS, such as a Vertica DBMS, in order to develop a user defined function, the function of Pseudo-code (1) may be wrapped into a user defined function. With respect to wrapping of the function of Pseudo-code (1) into a user defined function, a ScalarFunction class may be subclassed to implement the data processing performed for the user defined function, and a ScalarFunctionFactory class may be subclassed, where the ScalarFunctionFactory class may define metadata about the user defined function, such as arguments and return type, and create an instance of the ScalarFunction subclass. The arguments and return type of the user defined function may be defined by overriding a ScalarFunctionFactory.getPrototype technique. A createScalarFunction may be overridden to create an instance of the ScalarFunction subclass. The subclass of ScalarFunction may at least override a processBlock technique, which performs the actual processing. The processBlock technique may read a row of arguments, perform an operation on the arguments, and output a value. The processBlock technique may repeat this process until every row of input has been read. The parameters passed to the processBlock technique may include an instance of a ServerInterface class which provides utility techniques to interact with a Vertica server, an instance of a BlockReader class to read data, and an instance of a BlockWriter class to write the output. The overridden processBlock technique may read input arguments from the BlockReader instance by using data-type-specific getters, such as getLong and getString. The overridden processBlock technique may perform processing needed on the data to obtain results. When the processBlock technique has completed processing of the input, a return value may be written by calling a data type specific technique on a BlockWriter object, and the processBlock technique may advance to a next row of output by calling BlockWriter.next. Yet further, for the example of the Vertica DBMS, if types with precision such as varchar or varbinary are used, a getReturnType( ) technique may need to be overridden to set additional information about the user defined function's output argument. Once the user defined function is developed (e.g., by wrapping the function of Pseudo-code (1) into a user defined function), the user defined function may need to be registered with a query engine in order to be used.

From this specific example related to development and registration of a user defined function for the Vertica DBMS, it can be seen that such development and registration of individual user defined functions can be challenging. Further, with respect to existing libraries of predefined functions that may be re-usable in Structured Query Language (SQL) queries, development and registration of a large number of individual functions may also be challenging, for example, from scalability and maintainability viewpoints.

According to examples, in order to address the aforementioned aspects related, for example, to development and registration of a user defined function, and/or development and registration of user defined functions from existing libraries of predefined functions, a dynamic function invocation apparatus and a method for dynamic function invocation are disclosed herein. With respect to the apparatus and method disclosed herein, instead of developing and registering user defined functions one by one statically, the apparatus and method disclosed herein may provide for SQL queries to dynamically load and invoke functions that are pre-coded externally as a regular function (e.g., the function of Pseudo-code (1)), without being wrapped into user defined functions, and without being registered to a query engine. For example, the apparatus and method disclosed herein may provide for SQL queries to dynamically load and invoke Java functions pre-coded externally as a regular Java function without being wrapped into a user defined function, and without being registered to a query engine.

According to examples, the apparatus and method disclosed herein may generally include a hardware implemented dynamic function invocation module that is executed by a hardware processor to provide for dynamic loading of functions. For example, the dynamic function invocation module may load predefined functions (e.g., the function of Pseudo-code (1)) to queries. According to an example, the predefined functions may include Java functions that are loaded to SQL queries. The loaded functions may be coded without using DBMS system calls, or are accessible from an existing library of functions including Java functions.

For example, for the apparatus and method disclosed herein, the function of Pseudo-code (1) (or a plurality of functions 1, 2, . . . , n) may be developed in a user's class (e.g. a class denoted "my") as follows:

Pseudo-code (2)

```
public static int add2Ints(int a, int b) {
    return a + b;
}
```

Further, the function of Pseudo-code (1) may be invoked in a SQL query as follows:

select *DF*('my:add2Ints',*T*.a,1)from *T*;     Pseudo-code (3)

For Pseudo-code (3), T may represent a table, and T.a may represent an integer column. Further, "my" may represent the name of the class that includes the function "add2Ints". The class name "my" may be converted to a class object instance, and function class name "add2Ints" may be converted to a function object instance. DF may represent a dynamic function that invokes a function (e.g., the function "add2Ints") in a SQL query.

With respect to invocation of a function existing in a library, (e.g., a java.lang.Math library), a function may be invoked in a SQL query as follows:

select *DF*('java.lang.Math:cos',5.0);     Pseudo-code (4)

select *DF*('java.lang.Math:pow',*T*.b,5.0)from *T*;     Pseudo-code (5)

For Pseudo-code (5), T.b may represent a value of column b of table T. The dynamic function invocation module may provide for the development of functions, for example, extremely, for use in SQL queries without the need to wrap the functions in user defined functions (i.e., without using a DBMS's system APIs), to thus provide for the direct invocation of existing functions. Moreover, the dynamic function invocation module may eliminate the need to register a large number of functions that are developed, and the maintenance of a large number of registered functions by a DBMS.

Thus, the apparatus and method disclosed herein may simplify the development of database application functions by eliminating the need to wrap functions into user defined functions, and register the user defined functions. In this regard, functions may also be developed by using non-DBMS specific function development kits. The apparatus and method disclosed herein may also provide for the coding of functions independent of DBMS system calls, to thus avoid possible inaccuracies and inefficiencies related to use of specific system calls. The apparatus and method disclosed herein may facilitate leveraging of existing function libraries, without the need to wrap a large number of existing functions one by one. Further, the apparatus and method disclosed herein may eliminate the need to register user defined functions, which may thus reduce use of resources related to maintenance of a large number of user defined functions.

Thus, the apparatus and method disclosed herein may provide for the elimination of user defined function wrapping by providing for functions, such as scalar functions, to be developed independent of a DBMS function development technique, and providing for the direct invocation of existing library functions. By using the dynamic function as described herein, an existing function may be directly invoked at runtime, which thus eliminates the need to first wrap an existing function to generate a user defined function, to register the user defined function, and to then use the registered user defined function at runtime.

FIG. 1 illustrates an architecture of a dynamic function invocation apparatus (hereinafter also referred to as "apparatus 100"), according to an example of the present disclosure. Referring to FIG. 1, the apparatus 100 is depicted as including a dynamic function invocation module 102 to ascertain a query 104 for a DBMS. The apparatus 100 may be part of a DBMS system, or operate independently from a DBMS as illustrated in FIG. 1. The dynamic function invocation module 102 may implement a dynamic function 106 as a meta user defined function to invoke a plurality of different coded functions including a coded function 108 (generally "function 108") that is to be invoked by the query 104 to perform an operation related to the DBMS. The dynamic function invocation module 102 may execute the dynamic function 106 by the query 104 to load and invoke the coded function 108 to perform the operation related to the DBMS.

Referring to FIG. 1, the dynamic function invocation module 102 may load the coded function 108, such as a Java function, for the query 104, such as a SQL query. According to an example, the coded function 108 may be predefined (e.g., by a user). The loaded function 108 may be coded at 110 without using DBMS system calls, or accessible from an existing library 112 of functions, such as a library of Java functions.

As described herein, the dynamic function invocation module 102 may implement the dynamic function 106 as a meta user defined function. With respect to the implementation of the dynamic function 106 as a meta user defined function, instead of including the functionality of a statically designed application specific function, the dynamic function 106 may be executed with the query 104, and include the functionality to load, resolve, and invoke an externally defined function such as the function 108. In order for the dynamic function 106 to accommodate any function, the input 114, output 116, and body 118 of dynamic function 106 may be generic.

The dynamic function 106 may load the function 108 (or a plurality of functions such as the function 108) by name, and match input arguments for the input 114 with the named function based on Java class-loader and reflexion mechanisms. The Java class-loader may be used to create a class object by name, and then create an instance object of that class, which provides for invoking of the processes of that instance. Given a string with its content as a function name, the reflexion mechanisms may be used to invoke that function. The dynamic function 106 may be called in the query 104, which may include a SQL query, and thus handled as described herein.

With respect to the input 114 of the dynamic function 106, the dynamic function 106 may receive any input, namely, any number of input arguments with mixed types. Examples of types of input arguments may include integer, Boolean, string, double, numeric, date, timestamp, etc. For the dynamic function 106, the correspondence between types of input arguments and Java class/type may include:

```
argType =   vType.isInt( )          → Integer.TYPE;
            vtype.isBool( )         → Boolean.TYPE;
            vtype.isStringType( )   → String.class;
            vtype.isVarchar( )      → String.class;
            vtype.isLongVarchar( )  → String.class;
            vtype.isFloat( )        → Double.TYPE;
            vtype.isNumeric( )      → Double.TYPE;
            vtype.isDate( )         → Date.class
            vtype.isTimestamp( )    →Timestamp.class;
```

For the dynamic function 106, a numeric argument such as 1.23 appearing in "select f(T.a, 1.23) from T" may be treated as a double value v resolved through binary-string-double conversion which may be implemented as follows:

VNumeric vn=argReader.getVNumeric(index);

double v=Double.parseDouble(vn.toString( ));

The dynamic function 106 may include a heuristic technique signature lookup and the corresponding type conversion for the invoked techniques with float type arguments. With respect to the corresponding type conversion, an input argument may be converted to the type needed by the dynamic function 106.

With respect to the output 116 of the dynamic function 106, the output 116 of the dynamic function 106 may be specified as "String", and any type of returned value of an invoked function may be converted to a string value using the technique toString( ). In this regard, any type of returned value of an invoked function may be represented as a string, and a string may be used to unify a return type. SQL queries and SQL built-in functions may handle the string to numeric conversion as illustrated in the following allowable queries:

```
select AddIntsUdf(T.id, '1') as v from T) r;
select sum(v) from (
    select DF('com.vertica.exp.Samples:addInts',1, 2)) r;
```

When the result of the dynamic function 106 in the string type is to be passed up to another function invoked as non-string type by the dynamic function 106, the corresponding SQL type conversion, such as TO_NUMBER, may be used. In this regard, the function return type may be specified as a string for generality, and after a query receives a value returned from the function, the value may need to be converted back to number (e.g., integer, float, etc.) for further use.

With respect to resolution of the dynamic function 106, an invoked function may be specified as DF('cname:fname', $a_1$, . . . , $a_n$), where cname may name a class, fname may name a static function (e.g., the function 108) defined in the class cname, and $a_1$, . . . , $a_0$ may represent arguments of the function 108. The cname may be converted to a class instance, and the fname may be converted to a function instance, and the converted cname and fname may be used to invoke the appropriate function.

The dynamic function 106 may include scopes for function resolution that include, for example, per function and per block, as arguments may be retrieved by an instance of the dynamic function 106 (i.e. a user defined scalar function (UDSF) instance). With respect to a per-block scope, the function resolution may be performed in a per-block scope (i.e., per-block of a function including a plurality of blocks) where an instance of the dynamic function 106 has already created and is able to retrieve the input type information. With respect to the per-function scope, a class may be resolved at a per-function level if the class name is treated as a static parameter rather than a dynamic argument.

Generally, with respect to the dynamic function 106, resolving a function may include dividing the string "cname:fname" to the class name, cname, and function name, fname. Resolving a function may further include identifying the class, c, with c=Class.forName(cname). A DBMS API, such as a Vertica API, may be used to retrieve arguments and convert their DBMS types to Java types, resulting in an array Class[ ] argTypes, where the conversion may represent a correspondence between Vertica type name and Java type name for the same type. The named static technique defined in class c with the matching argument number and types may be resolved as f=c.getDeclaredMethod(fname, argTypes). These steps may be performed once per-block. Further, for each input argument list (Object[ ] args), the function f may be invoked as v=f.invoke(c, args), with the resulting value v being converted to string as the output 116.

The modules and other elements of the apparatus 100 may be machine readable instructions stored on a non-transitory computer readable medium. In this regard, the apparatus 100 may include or be a non-transitory computer readable medium. In addition, or alternatively, the modules and other elements of the apparatus 100 may be hardware or a combination of machine readable instructions and hardware.

Figure 3:
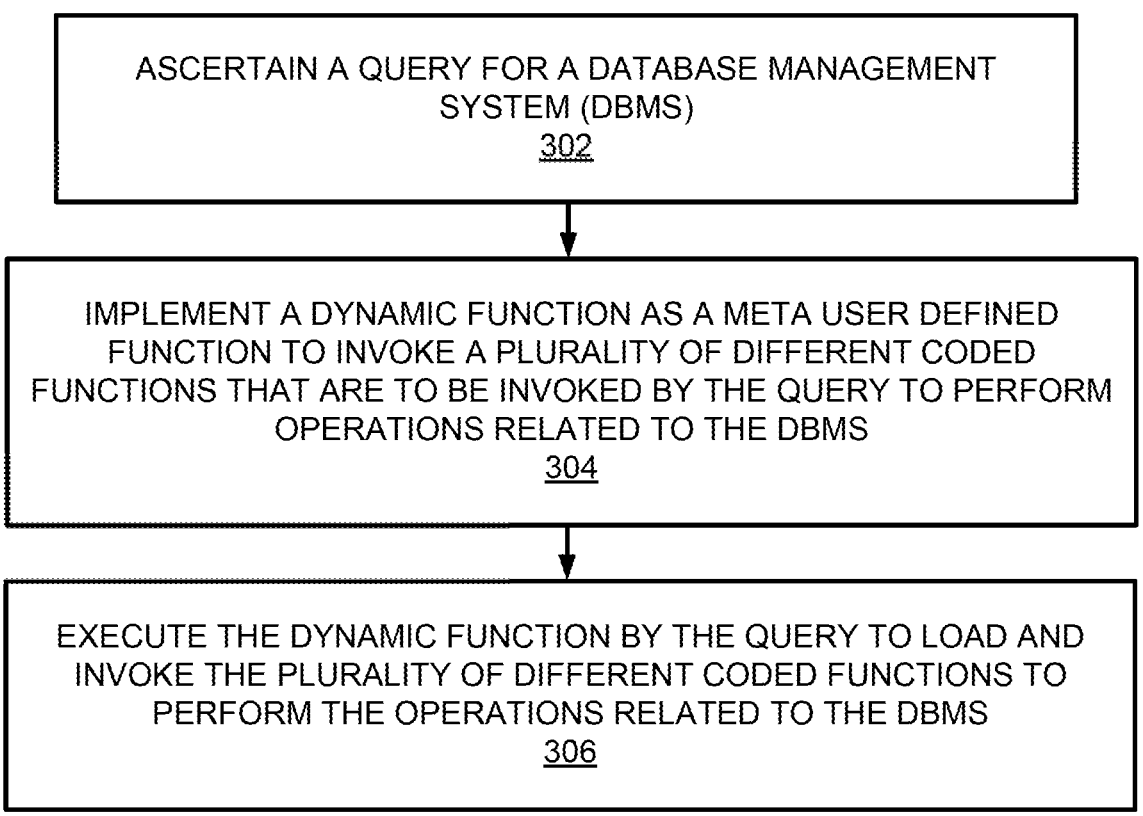
FIG. 3 illustrates further details of the method for dynamic function invocation, according to an example of the present disclosure.
Figure 4:
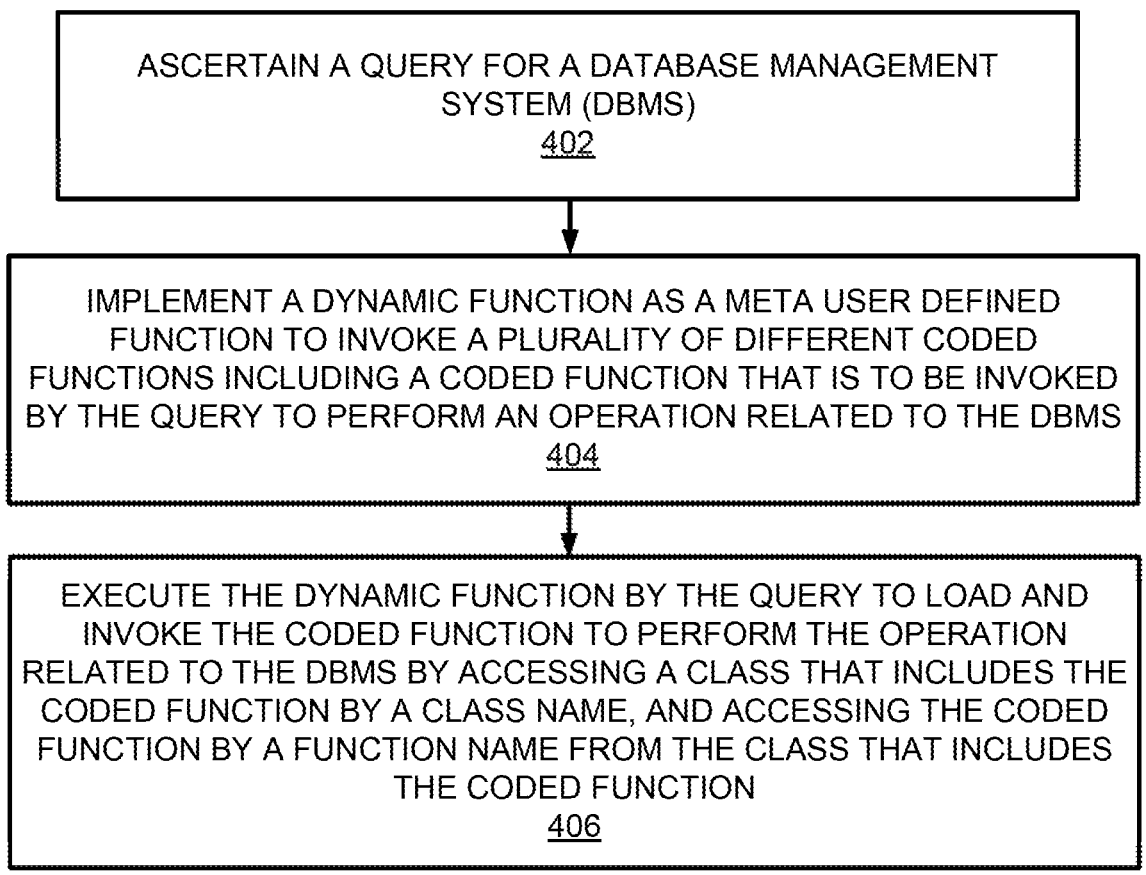
FIG. 4 illustrates further details of the method for dynamic function invocation, according to an example of the present disclosure.

FIGS. 2-4 respectively illustrate flowcharts of methods 200, 300, and 400 for dynamic function invocation, corresponding to the example of the dynamic function invocation apparatus 100 whose construction is described in detail above. The methods 200, 300, and 400 may be implemented on the dynamic function invocation apparatus 100 with reference to FIG. 1 by way of example and not limitation. The methods 200, 300, and 400 may be practiced in other apparatus.

Referring to FIG. 2, for the method 200, at block 202, the method may include ascertaining a query 104 for a DBMS. For example, referring to FIG. 1, the dynamic function invocation module 102 may ascertain a query 104 for a DBMS.

At block 204, the method may include implementing a dynamic function 106 as a meta user defined function to invoke a plurality of different coded functions including a coded function 108 that is to be invoked by the query 104 to perform an operation related to the DBMS. For example, referring to FIG. 1, the dynamic function invocation module 102 may implement a dynamic function 106 as a meta user defined function to invoke a plurality of different coded functions including a coded function 108 that is to be invoked by the query 104 to perform an operation related to the DBMS.

At block 206, the method may include executing the dynamic function 106 by the query 104 to load and invoke the coded function 108 to perform the operation related to the DBMS. For example, referring to FIG. 1, the dynamic function invocation module 102 may execute the dynamic function 106 by the query 104 to load and invoke the coded function 108 to perform the operation related to the DBMS.

According to an example, for the method 200, the coded function 108 may be generated by a user to perform an operation on a variable.

According to an example, for the method 200, executing the dynamic function 106 by the query 104 to load and invoke the coded function 108 to perform the operation related to the DBMS may further include loading the coded function 108 from a library 112 of coded functions that are to perform operations on variables.

According to an example, for the method 200, the coded function 108 may include code that is independent of system calls related to the DBMS.

According to an example, for the method 200, executing the dynamic function 106 by the query 104 to load and invoke the coded function 108 to perform the operation related to the DBMS may further include invoking the coded function 108 independently of wrapping of the coded function 108 as a user defined function that is specific to the DBMS and registration of the coded function 108 to a query engine for the DBMS.

According to an example, for the method 200, executing the dynamic function 106 by the query 104 to load and invoke the coded function 108 to perform the operation related to the DBMS may further include accessing a class that includes the coded function 108 by a class name, and accessing the coded function 108 by a function name from the class that includes the coded function.

According to an example, for the method 200, executing the dynamic function 106 by the query 104 to load and invoke the coded function 108 to perform the operation related to the DBMS may further converting the class name to a class object instance, and converting the function name to a function object instance.

Referring to FIG. 3, for the method 300, at block 302, the method may include ascertaining a query 104 for a DBMS. For example, referring to FIG. 1, the dynamic function invocation module 102 may ascertain a query 104 for a DBMS.

At block 304, the method may include implementing a dynamic function 106 as a meta user defined function to invoke a plurality of different coded functions that are to be invoked by the query 104 to perform operations related to the DBMS. For example, referring to FIG. 1, the dynamic function invocation module 102 may implement a dynamic function 106 as a meta user defined function to invoke a plurality of different coded functions that are to be invoked by the query 104 to perform operations related to the DBMS.

At block 306, the method may include executing the dynamic function 106 by the query 104 to load and invoke the plurality of different coded functions to perform the operations related to the DBMS. For example, referring to FIG. 1, the dynamic function invocation module 102 may execute the dynamic function 106 by the query 104 to load and invoke the plurality of different coded functions to perform the operations related to the DBMS.

According to an example, for the method 300, executing the dynamic function 106 by the query 104 to load and invoke the plurality of different coded functions to perform the operations related to the DBMS may further include retrieving arguments related to each of the plurality of different coded functions, converting DMBS types of the arguments to Java types, and using the Java types of the arguments to perform the operations related to the DBMS.

According to an example, for the method 300, executing the dynamic function 106 by the query 104 to load and invoke the plurality of different coded functions to perform the operations related to the DBMS may further include accessing a library 112 that includes the plurality of different coded functions by a library name, and accessing the plurality of different coded functions from the library 112.

Referring to FIG. 4, for the method 400, at block 402, the method may include ascertaining a query 104 for a DBMS. For example, referring to FIG. 1, the dynamic function invocation module 102 may ascertain a query 104 for a DBMS.

At block 404, the method may include implementing a dynamic function 106 as a meta user defined function to invoke a plurality of different coded functions including a coded function 108 that is to be invoked by the query 104 to perform an operation related to the DBMS. For example, referring to FIG. 1, the dynamic function invocation module 102 may implement a dynamic function 106 as a meta user defined function to invoke a plurality of different coded functions including a coded function 108 that is to be invoked by the query 104 to perform an operation related to the DBMS.

At block 406, the method may include executing the dynamic function 106 by the query 104 to load and invoke the coded function 108 to perform the operation related to the DBMS by accessing a class that includes the coded function 108 by a class name, and accessing the coded function 108 by a function name from the class that includes the coded function. For example, referring to FIG. 1, the dynamic function invocation module 102 may execute the dynamic function 106 by the query 104 to load and invoke the coded function 108 to perform the operation related to the DBMS by accessing a class that includes the coded function 108 by a class name, and accessing the coded function 108 by a function name from the class that includes the coded function.

Figure 5:
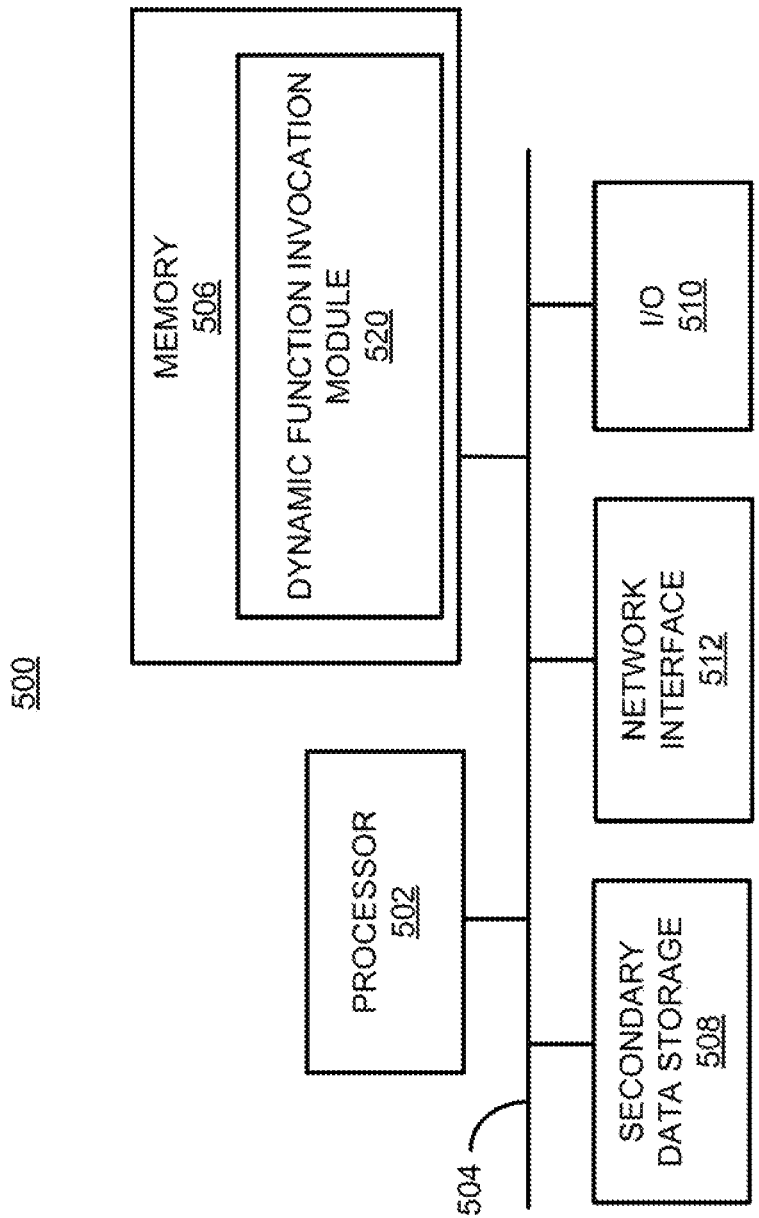
FIG. 5 illustrates a computer system, according to an example of the present disclosure.

FIG. 5 shows a computer system 500 that may be used with the examples described herein. The computer system 500 may represent a generic platform that includes components that may be in a server or another computer system. The computer system 500 may be used as a platform for the apparatus 100. The computer system 500 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 500 may include a processor 502 that may implement or execute machine readable instructions performing some or all of the methods, functions and other processes described herein. Commands and data from the processor 502 may be communicated over a communication bus 504. The computer system may also include a main memory 506, such as a random access memory (RAM), where the machine readable instructions and data for the processor 502 may reside during runtime, and a secondary data storage 508, which may be non-volatile and stores machine readable instructions and data. The memory and data storage are examples of computer readable mediums. The memory 506 may include a dynamic function invocation module 520 including machine readable instructions residing in the memory 506 during runtime and executed by the processor 502. The dynamic function invocation module 520 may include the modules of the apparatus 100 shown in FIG. 1.

The computer system 500 may include an I/O device 510, such as a keyboard, a mouse, a display, etc. The computer system may include a network interface 512 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method comprising:
ascertaining a query for a database management system (DBMS), wherein the query comprises a dynamic function corresponding to a plurality of coded functions, each coded function of the plurality of coded functions comprises a DBMS unwrapped coded function, and each coded function of the plurality of coded functions is unregistered with a query execution engine of the DBMS; and
executing, by a processor, the query, wherein the executing comprises the query execution engine loading a given coded function of the plurality of coded functions identified by the dynamic function from a library external to the DBMS and invoking the given coded function to perform an operation related to the DBMS.

2. The method of claim 1, wherein the given coded function comprises a Java function.

3. The method of claim 1, wherein the query comprises a Structured Query Language (SQL) query.

4. The method of claim 1, wherein the given coded function is generated by a user to perform an operation on a variable.

5. The method of claim 1, wherein the library comprises a library of coded functions that are to perform operations on variables.

6. The method of claim 1, wherein the given coded function is generated without using any system calls of the DBMS.

7. The method of claim 1, wherein the executing comprises accessing a library name specified by the query.

8. The method of claim 1, wherein the executing comprises:
accessing a class that includes the given coded function by a class name; and
accessing the given coded function by a function name from the class that includes the given coded function.

9. The method of claim 8, wherein the executing comprises:
converting the class name to a class object instance; and
converting the function name to a function object instance.

10. An apparatus comprising:
a processor; and
a memory storing machine readable instructions that, when executed by the processor, cause the processor to:
ascertain a query for a database management system (DBMS), wherein the query comprises a dynamic function corresponding to a plurality of coded functions, each coded function of the plurality of coded functions comprises a DBMS unwrapped coded function, and each coded function of the plurality of coded functions is unregistered with a query execution engine of the DBMS; and
execute the query, wherein the executing comprises causing the query execution engine to load a given coded function of the plurality of coded functions identified by the dynamic function from a library external to the DBMS and cause the query execution engine to invoke the given coded function to perform an operation related to the DBMS.

11. The apparatus of claim 10, wherein the instructions, when executed by the processor, further cause the processor to:
retrieve arguments related to the given coded function;
convert database management system (DBMS) types of the arguments to Java types; and
use the Java types to perform the operation.

12. The apparatus of claim 10, wherein the instructions, when executed by the processor, further cause the processor to:
access a class that includes the given coded function by a class name; and
access the given coded function by a function name from the class that includes the given coded function.

13. A non-transitory computer readable storage medium that stores machine readable instructions that, when executed by a processor, cause the processor to:
ascertain a query for a database management system (DBMS), wherein the query comprises a dynamic function corresponding to a plurality of coded functions, each coded function of the plurality of coded functions comprises a DBMS unwrapped coded function, and each coded function of the plurality of coded functions is unregistered with a query execution engine of the DBMS; and
execute the query, wherein the executing comprises causing the query execution engine to load a given coded function of the plurality of coded functions identified by the dynamic function from a library external to the DBMS and invoke the given coded function to perform an operation related to the DBMS.

14. The non-transitory computer readable storage medium of claim 13, wherein the given coded function is generated without using any system calls of the DBMS.

15. The non-transitory computer readable storage medium of claim 13, wherein the instructions, when executed by the processor, further cause the processor to access a library name specified by the query.

* * * * *